Aug. 11, 1953      E. MARTIN      2,648,446
FEED MECHANISM

Filed Sept. 9, 1948      7 Sheets-Sheet 1

INVENTOR.
EUGENE MARTIN
BY
Otto Mueller
Attorney

Aug. 11, 1953
E. MARTIN
2,648,446
FEED MECHANISM
Filed Sept. 9, 1948
7 Sheets-Sheet 2
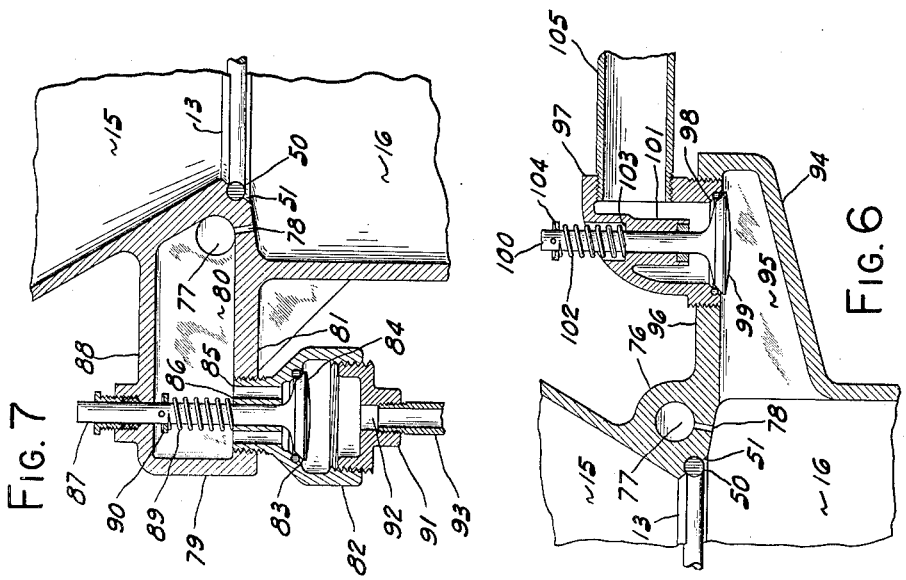
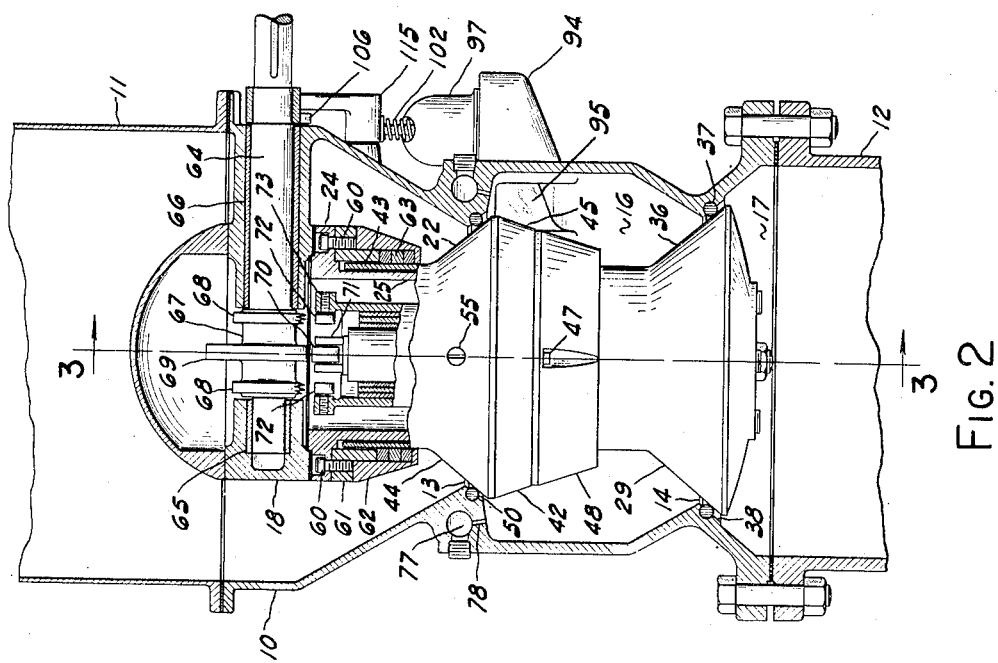
INVENTOR.
EUGENE MARTIN
BY
Otto Maelle
Attorney Aug. 11, 1953          E. MARTIN                    2,648,446
                     FEED MECHANISM
Filed Sept. 9, 1948                          7 Sheets-Sheet 3
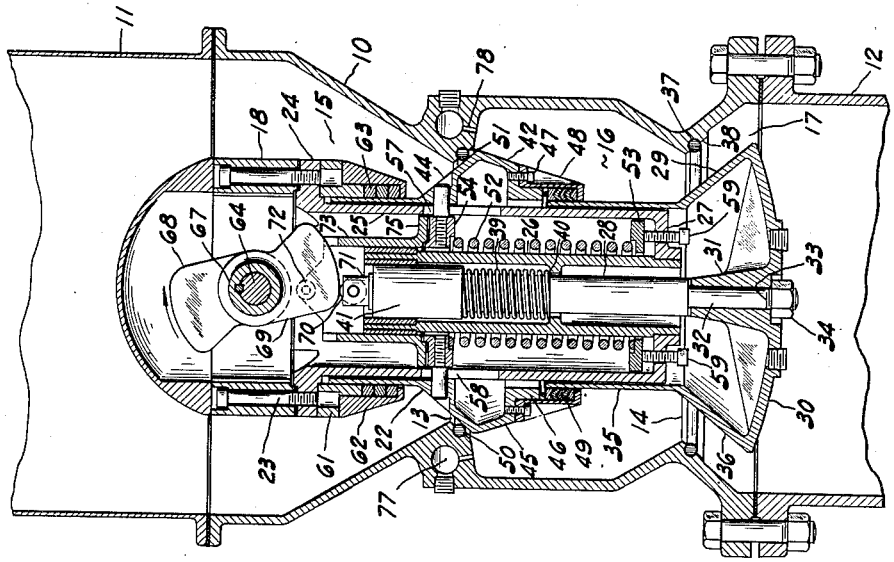
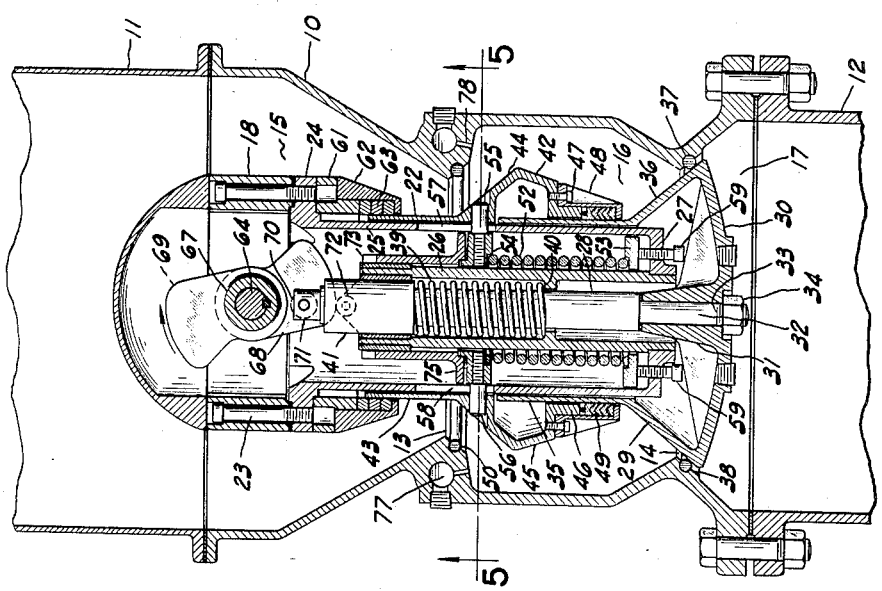
INVENTOR.
EUGENE MARTIN
BY
*Otto Mueller*
Attorney Aug. 11, 1953

E. MARTIN 2,648,446

FEED MECHANISM

Filed Sept. 9, 1948

INVENTOR.
EUGENE MARTIN
BY
*Otto Moeller*
Attorney

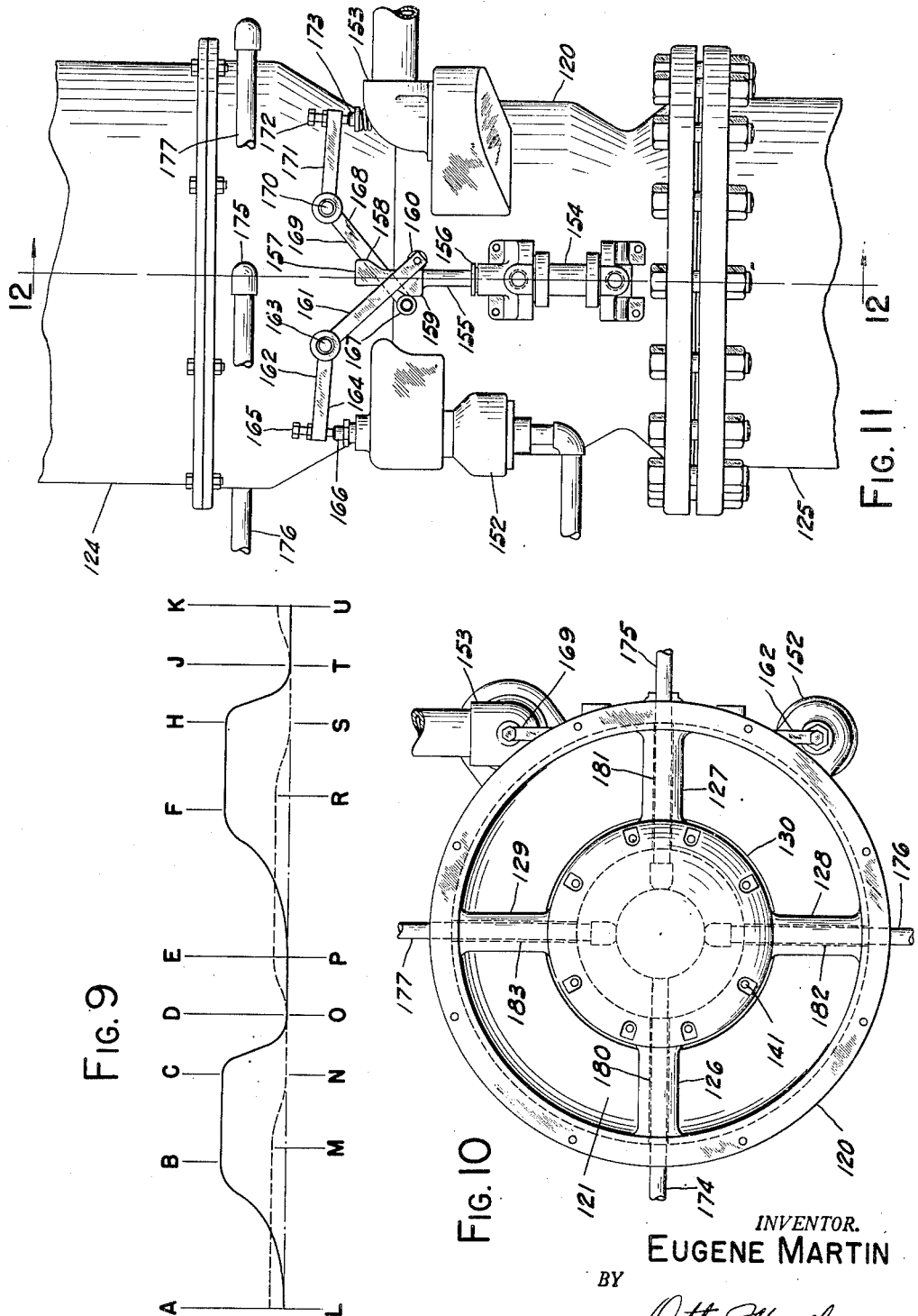

Aug. 11, 1953   E. MARTIN   2,648,446
FEED MECHANISM
Filed Sept. 9, 1948   7 Sheets-Sheet 6

INVENTOR.
EUGENE MARTIN
BY
Otto Mueller
Attorney

Aug. 11, 1953 E. MARTIN 2,648,446
FEED MECHANISM
Filed Sept. 9, 1948 7 Sheets-Sheet 7

INVENTOR.
EUGENE MARTIN
BY
Otto Moeller
Attorney

Patented Aug. 11, 1953

2,648,446

UNITED STATES PATENT OFFICE 2,648,446

FEED MECHANISM

Eugene Martin, Wesleyville, Pa., assignor to Read Standard Corporation, a corporation of Delaware Application September 9, 1948, Serial No. 48,462

4 Claims. (Cl. 214—17)

My invention relates to feeding mechanism for feeding material, particularly granular or finely divided solid material in successive intermittent charges from a source of supply to a receiver.

One object of my invention is to provide a feeder of the above type wherein the greater possible freedom of movement of the material into the feeder and from the feeder is provided, and wherein shearing through the material charge by the elements that alternately seal off the material admission and material discharge openings is eliminated.

Another object of the invention is to provide a feeder of the above type for feeding material to a receiver from a source of supply in which a pressure differential exists between the receiver and the source of supply and wherein an effectual seal is maintained at all times against escape of pressure past the feed mechanism.

Another object of the invention is to provide a novel feeding mechanism employing as the principal elements of the feeding device a pair of feed valves movably supported within a valve body having an upper feed inlet and a lower feed outlet, the feed valves being operatively connected to means for alternately moving the valves to and away from respective vertically spaced valve seats extending inwardly of the inside wall of the valve body and defining a feeding chamber between them.

Another object of the invention is to provide in a feeding mechanism of the character just described, means facilitating discharge of material from the feeding chamber into a pressurized receiver; and it is a further object to provide effective venting means for releasing the pressure trapped in the feeding chamber after the lower feed valve closes and before the upper feed valve opens.

Another object of the invention is to provide novel actuating means including sequential timing mechanism for coordinating the operation of the feed valves, the discharge facilitating means and the venting means.

It is another object of the invention to provide a device of the character above described that is simple and rugged in construction, readily assembled, capable of operation of long periods of time with freedom from mechanical difficulty and with minimum of attendance.

The invention accordingly comprises the features of construction, combination of elements and arrangement of parts illustrated in the drawings and hereinafter described in detail. In the drawings—

Figure 2 is a sectional view taken on line 2—2 of Figure 1, with parts in elevation, showing the feed valves disposed against their seats;

Figure 3 is a sectional view taken on line 3—3 of Figure 2 with the upper feed valve shown in its open position;

Figure 4 is a sectional view of the feed mechanism similar to that shown in Figure 3, with the feed valves shown in their opposite positions;

Figure 6 is an enlarged fragmentary sectional view taken on the line 6—6 of Figure 5;

Figure 7 is an enlarged fragmentary sectional view taken on the line 7—7 of Figure 5;

Figure 9 is a diagrammatic representation of the sequential operation of the feed valves, the pressure intake valve and the exhaust valve of the feed mechanism;

Figure 10 is a plan view of another form of the feed mechanism;

Figure 11 is a view in elevation of the same form of the invention;

Figure 1:
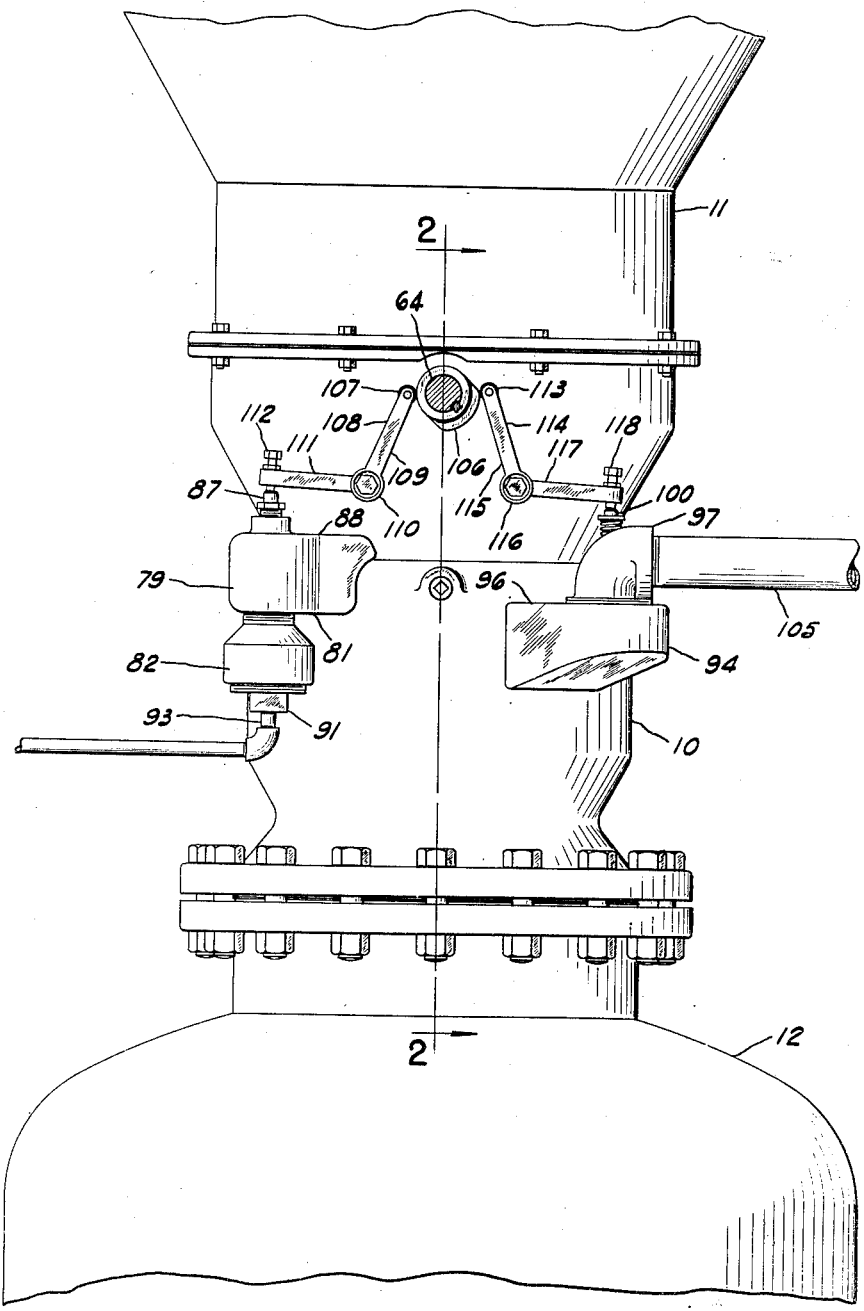
Figure 1 is a view in elevation of one form of the novel feed mechanism.

While the feed mechanism constituting my invention may be employed for feeding various kinds of granular or finely divided solid material from a source of supply to a point of discharge, it is particularly adapted for delivery of finely divided coal into a pressurized receiver, and it will be so described hereinafter.

Referring to Figures 1 to 8, inclusive, showing one embodiment of the invention, the feeding device comprises a preferably cylindrical valve body 10 open at top and bottom. The upper end of the valve body 10 communicates with a coal supply hopper 11 and the lower end thereof communicates with a pressurized tank or receptacle 12.

Considered from top to bottom, the wall of the valve body 10 tapers to an internal annular ledge 13, then expands abruptly and tapers again to a second internal annular ledge 14, and then flares for its remaining distance, to define within the body a coal receiving chamber 15, a pressurizing chamber 16, and a discharge mouth 17.

Figure 8:
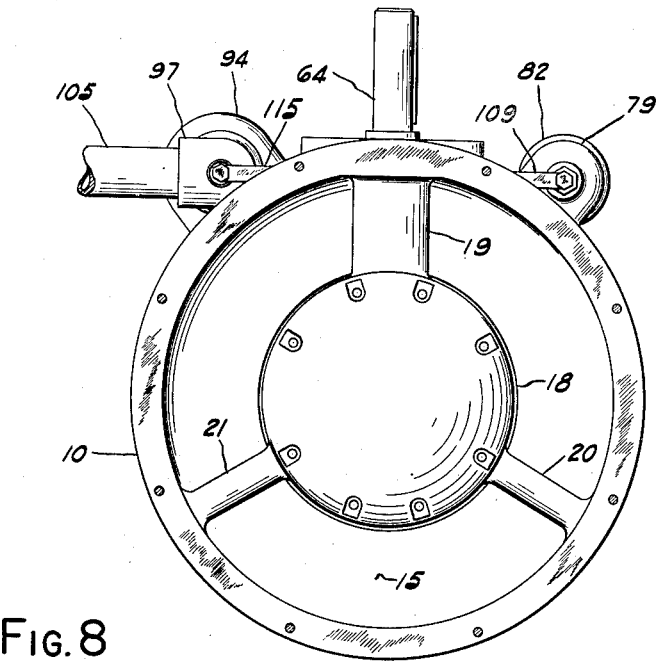
Figure 8 is a plan view of the novel feed mechanism.

Disposed in the upper end of the chamber 15 axially concentric with the cylindrical valve body 10 is an open ended cylindrical housing 18 which is attached to the valve body 10 by a suitable number of radial arms, three such arms, 19, 20 and 21 being shown in Figure 8. The valve body 10, cylindrical housing 18 and arms 19, 20 and 21 are preferably formed as an integral casting. For a purpose that will become apparent later in the description, the arm 19 is formed with a larger cross sectional area than the arms 20 and 21.

A valve assembly, designated generally by the numeral 22, is pendently supported within the valve body 10 from the cylindrical housing 18 by means of countersunk bolts 23 that pass through the wall of the housing 18 and the circumferential flange 24 of the cylindrical housing or valve support 25.

Axially disposed within the housing 25, which will be referred to as the outer housing, is a cylindrical inner housing 26 suitably secured in and opening at its lower end through the lower end wall 27 of the outer housing 25.

A valve stem 28 is disposed axially within the inner housing 26 and a valve 29, hereinafter referred to as the lower valve, is securely fastened on the lower end of the valve stem 28 in any suitable manner. As shown in the drawings, the bottom wall 30 of the lower valve 29 is provided with a hub 31 slidable up on the reduced extension 32 of the stem 28, the shoulder formed at the juncture of the stem 28 and its extension 32 forming a stop. The projecting end of the stem extension 32 is threaded as at 33 and a nut 34 screwed thereon secures the valve 29 to the valve stem 28.

The lower valve 29 comprises a cylindrical upper portion 35 arranged in telescoping engagement with the lower portion of the outer housing 25, and also includes a lower flared skirt portion 36 integrally formed with and joining the cylindrical portion 35 and the bottom wall 30 of the valve 29. In the upper or closed position of the lower valve 29, as shown in Figures 2 and 3, its flared skirt portion 36 seats against a non-metallic ring 37 secured in an annular groove that is formed in a flared annular seat 38 of the inner wall of the valve body 10 subjacent the ledge 14.

The lower valve 29 is normally held in its up or closed position by a spring 39 disposed within the inner housing 26 and encircling the valve stem 28. The lower end of the spring 39 seats on an annular retaining flange 40 projecting inwardly of the inside surface of the inner housing 26. The upper end of spring 39 engages the projecting shoulder of a retainer member 41, which is preferably threaded on a threaded upper portion of the valve stem 28, though it is apparent that the retainer member 41 may be made as an integral enlargement of the valve stem 28. With the retainer member 41 threaded on the valve stem 28, the tension on spring 39 may readily be adjusted by turning the retainer member 41 in one direction or the other to move it closer to or farther from the spring retaining flange 40.

The valve assembly 22 includes a second valve 42, hereinafter referred to as the upper valve to distinguish from the lower valve 29. The upper valve 42 comprises a cylindrical upper portion 43 arranged in telescoping engagement with the upper portion of the outer housing 25, a flared skirt portion 44 continuing to a tapered and inwardly extending annular wall portion 45 and terminating in a cylindrical sleeve 46 arranged telescopically to receive the cylindrical portion 35 of the lower valve 29, as best shown in Figure 3.

Depending from the upper valve 42 and secured thereto in any practical manner, as by the bolts 47 shown in Figures 3 and 4, is a packing retaining ring 48 arranged to receive suitable packing 49. The packing 49 embraces the cylindrical portion 35 of the lower valve 29 providing a seal against leakage of pressure and coal dust from the chamber 16 past the cylindrical valve portion 35.

In the upper or closed position of the upper valve 42, as shown in Figures 2 and 4, its flared skirt portion 44 seats against a non-metallic ring 50 secured in an annular groove that is formed in a flared annular seat 51 of the inner wall of the valve body 10 subjacent the ledge 13.

Figure 5:
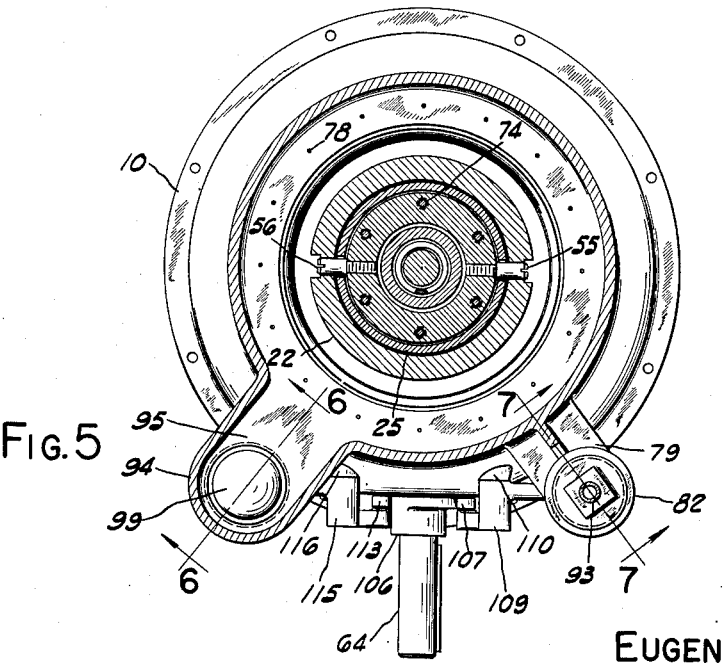
Figure 5 is a sectional view taken on the line 5—5 of Figure 3.

The upper valve 42 is normally held in its up or closed position by a spring 52 disposed within the outer housing 25 and encircling the inner housing 26. The lower end of the spring 52 seats on a retaining ring 53 disposed in the annular space between and defined by the inner and outer housings 26 and 25. The upper end of the spring 52 engages a ring shaped valve connecting plate 54 also disposed between the inner and outer housings 26 and 25. Pins 55 and 56 extending through the respective slots 57 and 58 in the outer housing 25, as shown in Figures 3, 4 and 5 rigidly secure the upper valve 42 with the plate 54. The tension on spring 52 may readily be adjusted by means of the pins 59 which are threaded in the bottom wall 27 of outer housing 25. By turning the pins 59 in one direction or the other, the retaining ring 53 may be raised or lowered to adjust the spring 52 to the tension desired to seat the upper valve 42.

Secured to the under side of the circumferential flange 24 of outer housing 25, by suitable means such as the countersunk bolts 60 shown in Figure 2, is a depending filler ring 61, which is arranged telescopically to receive the cylindrical portion 43 of upper valve 42, as shown in Figures 2 and 4. Depending from the filler ring 61 and secured thereto in any practical manner, as by bolts (not shown), is a packing retaining ring 62 arranged to receive suitable packing 63. The upper packing retaining ring 62 is preferably the same as the lower packing retaining ring 48, however, the sections in the drawings are taken through the solid portion of the upper ring 62 and through the notched portion of the lower ring 48, so that the bolts corresponding to the bolts 47 of the lower ring 48 are not visible in the upper ring 62. The packing 63 embraces the cylindrical portion 43 of the upper valve 42 providing a seal against leakage of coal dust from the chamber 15 past the cylindrical valve portion 43.

As previously described, the upper and lower valves 42 and 29 are normally held seated or closed by the respective springs 52 and 39. Cam operated means is provided for alternately opening the upper and lower valves 42 and 29. This means includes a cam shaft 64 extending through the enlarged arm 19 into the cam housing 18, as best shown in Figure 2. The cam shaft 64 is journaled in spaced bearings 65 and 66 integrally formed on the inside surface of the housing 18. The bearing 66 forms in effect a continuation of the arm 19 providing a continuous bearing member.

Keyed on the shaft 64 between the bearings 65 and 66 is a cam set 67 comprising a pair of identical cams 68 spaced apart longitudinally of the shaft 64 for controlling the upper valve 42, and a cam 69 between the cams 68 diametrically opposite with respect thereto for controlling the lower valve 29.

The cam 69 engages a cam roller 70 mounted in a cam roller housing 71 formed with or otherwise secured to the upper end of the valve stem 28 for opening the lower valve 29, as shown in Figure 4. The cams 68 are adapted to engage cam rollers 72, best shown in Figure 2, mounted at diametrically opposite sides of the upper end of a cylindrical valve stem 73. The cylindrical valve stem 73 is disposed between the inner and outer housings 26 and 25 and is secured at its lower end to the valve connecting plate 54 in any suitable manner, as by bolts 74 shown in Figure 5, which extend through the flanged foot 75 of stem 73 into the plate 54. Engagement of the cams 68 with the rollers 72 effect opening of the upper valve 42, as shown in Figure 3. Any suitable means, not shown, may be employed for rotating the shaft 64.

During each revolution of the shaft 64 a certain sequence of events occurs. Starting, for example, with the cams 68 and 69 out of engagement with the rollers 72 and 70, as in Figure 2, both valves 29 and 42 are closed. Now when the cams 68 engage the rollers 72, the upper valve 42 opens, as in Figure 3, and the finely divided coal drops from chamber 15 into chamber 16. Following this, the cams 68 move out of engagement with the cam rollers 72, whereupon the upper valve 42 is again closed. Then the cam 69 engages the cam roller 70, as in Figure 4, whereupon lower valve 29 opens and the coal drops from chamber 16 through the discharge mouth 17 into the pressurized tank 12. Finally, the cam 69 moves out of engagement with the cam roller 70, whereupon the lower valve 29 is again closed. The cycle is then repeated for each revolution of the shaft 64.

In order to facilitate discharge of coal from the chamber 16 through the mouth 17 and into the pressurized tank 12 when the lower valve 29 opens, valve controlled means is provided for introducing air under pressure into the chamber 16 above the charge of coal disposed therein. Valve controlled means is also provided for venting or exhausting the pressure trapped in chamber 16 after the coal has been discharged therefrom and the lower valve 29 has closed, and before the upper valve 42 has reopened.

The operation of the valve controlled pressurizing and venting means, just referred to, is synchronized with the operation of the valves 29 and 42, so that all four of these elements function in a regular sequence for each revolution of the shaft 64, as hereinafter described.

Referring first to the valve controlled pressurizing means, the valve body 10 is formed with a heavy wall portion 76 adjacent the ledge 13, in which wall portion 76 is provided an annular passage 77. A plurality of jet openings 78 provide communication between the passage 77 and the upper end of chamber 16 whereby air under pressure is admitted to the chamber 16 above the coal therein.

A pressure inlet housing 79, which may be connected to or integral with the valve body 10, defines a chamber 80 that communicates with the annular passage 77, as best understood from Figures 1 and 7. Threaded in the bottom wall 81 of housing 79, is a valve casing 82 having a seat 83 formed therein for receiving the valve 84. The neck portion 85 of the valve casing 82 has the form of a spider with a central apertured sleeve 86 providing a guide for the actuating stem 87 of the valve 84. The actuating stem 87 of valve 84 extends upwardly through the chamber 80 of housing 79 and projects through the top wall 88 of the housing 79. A spring 89 in the chamber 80, encircling the valve stem 87, is seated at its lower end on the sleeve 86 and at its upper end engages a spring retaining ring 90 secured in any suitable manner to the valve stem 87. The spring 89 thus holds the valve 84 in a normally seated or closed position. A plug 91 threaded in the open lower end of the valve casing 82 is provided with a central bore 92 arranged to threadedly receive a pipe 93 leading from a suitable source of air under pressure.

Referring now to the valve controlled venting or exhaust means, best understood from Figures 1 and 6, a vent housing 94 integrally formed with the valve body 10 defines a vent passage 95 that communicates with the upper end of the chamber 16 of the valve body 10. Threaded in the upper wall 96 of housing 94 is a valve casing 97 having a seat 98 formed therein for receiving the valve 99. The actuating stem 100 extends through a guide sleeve 101 formed interiorly in and with the valve casing 97 and projects through the top thereof. A spring 102 encircling the projecting portion of the actuating stem 100 is seated at its lower end on a counterbored shoulder 103 and at its upper end engages a spring retaining ring 104 suitably secured to the valve stem 100. The spring 102 thus holds the valve 99 in a normally seated or closed position. An exhaust pipe 105 leads from the valve casing 97 for suitably disposing of the vented air pressure.

The valves 84 and 99 are actuated by a cam 106 disposed outside the valve body 10 and keyed on the shaft 64 for rotation therewith, as best shown in Figure 1. The cam 106, for a portion of each revolution of the shaft 64, engages a cam roller 107 carried by the free end of an arm 108 of a bell crank 109 that is pivotally mounted at 110 on the outside of the valve body 10. The free end of the other arm 111 of the bell crank 109 carries an adjustable contact member 112 arranged to engage the actuating stem 87 of the valve 84. Referring to Figures 1 and 7, it is evident that engagement of cam 106 with cam roller 107 depresses the actuating stem 87 through the described mechanism and opens the valve 84 to admit air under pressure to the chamber 16 through the previously described jet apertures 78.

For another portion of each revolution of the shaft 64, cam 106 engages a cam roller 113 carried by the free end of an arm 114 of a bell crank 115 that is pivotally mounted at 116 on the outside of the valve body 10. The free end of the other arm 117 of the bell crank 115 carries an adjustable contact member 118 arranged to engage the actuating stem 100 of the valve 99. Referring to Figures 1 and 6, it is evident that engagement of cam 106 with cam roller 113 depresses the actuating stem 100 through the described mechanism and opens the valve 99 to permit exhausting of trapped pressure from the chamber 16.

The timing and order of operation of the valves 29, 42, 84 and 99 are determined by the length of the cams and their relative positions around the shaft 64. Figure 9, is a diagrammatic representation of the operation of the cams through one revolution of the shaft 64. The heavy line indicates the cam set 67 controlling the operation of the lower feed valve 29 and upper feed valve 42, and the broken line indicates the cam 106 controlling the operation of the pressure intake valve 84 and exhaust valve 99. The upper letters A to K refer to the coal feed valves 29 and 42 and the lower letters L to U refer to the pressure intake and exhaust valves 84 and 99.

In the operation of the invention, referring particularly to Figure 9, from A to B the leading edges of identical cams 68 are opening the upper feed valve 42; from B to C the outer edges of the cams 68 maintain the valve 42 in fully open position; while from C to D the trailing edges of cams 68 permit the valve 42 to close, the spring 52 as previously explained forcing the valve 42 to its closed position. With the opening of valve 42 it is apparent that coal will drop by gravity from the chamber 15 into the chamber 16 of the valve body 10.

During this interim the outer edge of cam 106 maintains the exhaust valve 99 fully open from L to M, while from M to N the trailing edge of cam 106 permits valve 99 to close. The air in chamber 16 displaced by the coal entering the chamber 16 is consequently permitted to exhaust freely through the vent passage 95, the valve casing 97 and then to the exhaust pipe 105, while the valve 99 is open.

From D to E both the upper valve 42 and the lower valve 29 are fully closed and at the same time, that is, from O to P, the leading edge of cam 106 is effecting opening of the pressure intake valve 84. This permits a pressure to build up in the chamber 16 above the coal therein. At E the leading edge of cam 69 effects opening of the lower feed valve 29, the upper feed valve 42 remaining closed, and from F to H the outer edge of cam 69 maintains the valve 29 in fully opened position, thereby permitting the coal to drop by gravity from the chamber 16 through the discharge mouth 17 and into the pressurized receptacle 12. During this interim, the outer edge of cam 106 maintains the pressure intake valve 84 fully open from P to R, and since as previously explained, this pressure is preferably greater than that in the receptacle 12, emptying of chamber 16 is greatly facilitated.

From R to S the trailing edge of cam 106 permits closing of the pressure intake valve 84, and from H to J the trailing edge of cam 69 permits closing of the bottom valve 29, the spring 39 as previously explained forcing the valve 29 to its closed position. Now, with both the upper and lower feed valves 42 and 29 closed from J to K, the leading edge of cam 106 effects opening of the exhaust valve 99 from T to U permitting the pressure trapped in chamber 16 to exhaust. The cycle of operations is then repeated.

The cams 68, 69 and 106 may be modified to alter the timing of the valves, however it is important that the lower feed valve 29 be fully closed before the upper feed valve 42 opens; that the upper feed valve 42 be fully closed before the lower feed valve 29 opens; that the pressure intake valve 84 be fully closed before the upper feed valve 42 opens; and that the exhaust valve 99 is fully closed while the lower feed valve 29 is open.

Referring now to Figures 10 to 14, there is illustrated a modified form of the invention, employing hydraulically operated means for controlling the operation of the various valves in place of the cam arrangement of the previously described form of the invention.

The valve body 120 is generally similar to the valve body 10 of the first form of the invention, being similarly formed to define a coal receiving chamber 121, a pressurizing chamber 122 and a discharge mouth 123. The chamber 121 communicates with a coal supply hopper 124 and the discharge mouth 123 communicates with a pressurized tank or receptacle 125.

Four radially extending arms 126, 127, 128 and 129 integrally connect the hollow hub 130 with the wall of the valve body 120. A valve assembly, denoted generally by the numeral 131, corresponding to the valve assembly 22 of the first form of the invention, is pendently supported within the valve body 120 from the hub member 130 by means of countersunk bolts (not shown), similar to the manner in which the countersunk bolts 23 support the valve assembly 22 as shown in Figures 3 and 4.

The valve assembly 131 includes the housing or valve support 132 provided in its lower portion with an annular inwardly extending flange 133 to which is pendently secured a hydraulic fluid cylinder 134 by suitable means, as bolts 135. The cylinder 134 houses a piston (not shown) and a piston stem 136 that projects through the lower cylinder head 137. Secured to the free end of the piston stem 136 is the lower feed valve 138, which is similar in construction to the lower feed valve 29 of the first form of the invention, and the upper portion of which embraces the lower portion of the housing 132.

Seated on the hub 130 is an annular plate 139 projecting inwardly of the hub, and seated on the plate 139 is a dome shaped cover 140. Bolts 141, as shown in Figure 10, extend through the cover 140 and plate 139 into the hub 130 and securely hold the plate 139 and cover 140 in place. A second hydraulic fluid cylinder 142 is pendently supported within the upper portion of housing 132 from the plate 139 by bolts 143.

Figure 12:
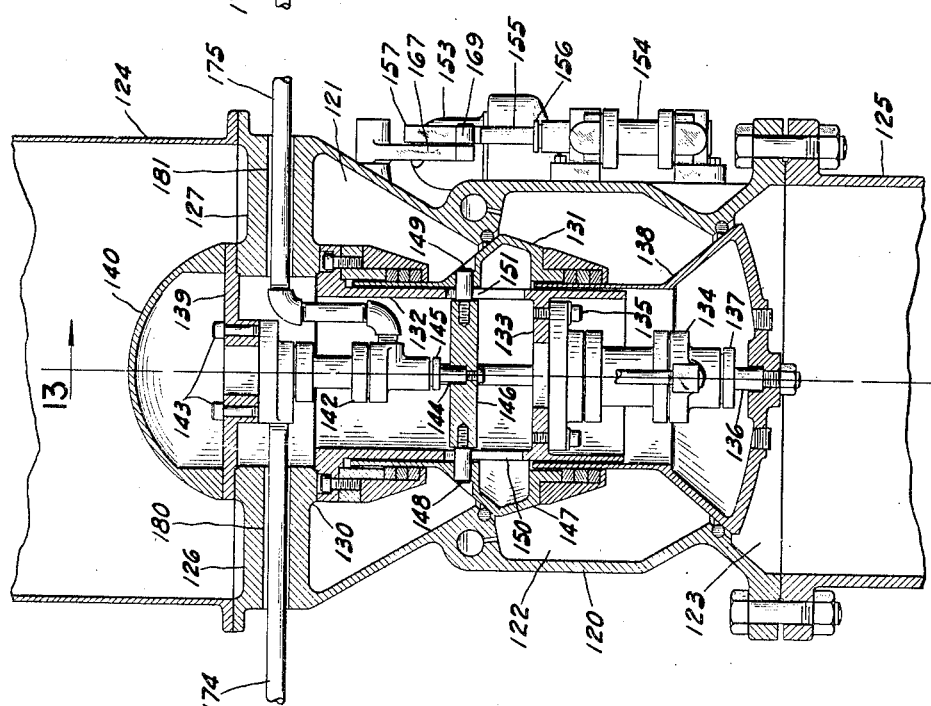
Figure 12 is a sectional view taken on the line 12—12 of Figure 11.

The cylinder 142 houses a piston (not shown) and a piston stem 144 that projects through the lower cylinder head 145. The free end of the piston stem 144 carries a plate member 146 which in turn supports the upper feed valve 147 by means of pins 148 and 149 that project through respective slots 150 and 151 in the housing 132, as shown in Figure 12. The valve 147, which is similar in construction to the upper feed valve 42 of the first form of the invention, embraces the upper portion of the housing 132.

Referring to Figure 11, the pressure intake valve 152 and the exhaust or vent valve 153 are the same as the intake and exhaust valves of the first form of the invention as shown respectively in Figures 7 and 6. The details of construction of valves 152 and 153 are, therefore, not shown or described.

The operating means for the valves 152 and 153 includes a hydraulic fluid cylinder 154 secured to the valve body 120. The cylinder 154 houses a piston (not shown) and a piston stem 155 that projects through the upper cylinder head 156. The free end of the piston stem 155 carries a cam member 157 provided with a cam shoulder 158 for opening the pressure intake valve 152 and a cam shoulder 159 for opening the exhaust or vent valve 153.

When the piston stem 155 is depressed, the cam shoulder 158 engages a cam roller 160 carried by the free end of an arm 161 of a bell crank 162 that is pivotally mounted at 163 on the outside of the valve body 120. The free end of the other arm 164 of the bell crank 162 carries an adjustable contact member 165 arranged to engage the actuating stem 166 of the pressure intake valve 152. When the piston stem 155 is raised to the position shown in Figure 11, the cam shoulder 159 engages a cam roller 167 carried by the free end of an arm 168 of a bell crank 169 that is pivotally mounted at 170 on the outside of the valve body 120. The free end of the other arm 171 of the bell crank 169 carries an adjustable contact member 172 arranged to engage the actuating stem 173 of the exhaust or vent valve 153.

The cam shoulders 158 and 159, as shown in Figure 11, are offset vertically of the cam member 157 so that when the pressure intake valve 152 is open then the exhaust valve 153 is closed, and vice versa. When the piston rod 155 is in an intermediate position, neither of the cam shoulders 158 and 159 engage the rollers 160 and 167, so that both valves are momentarily closed.

Figures 14, 15:
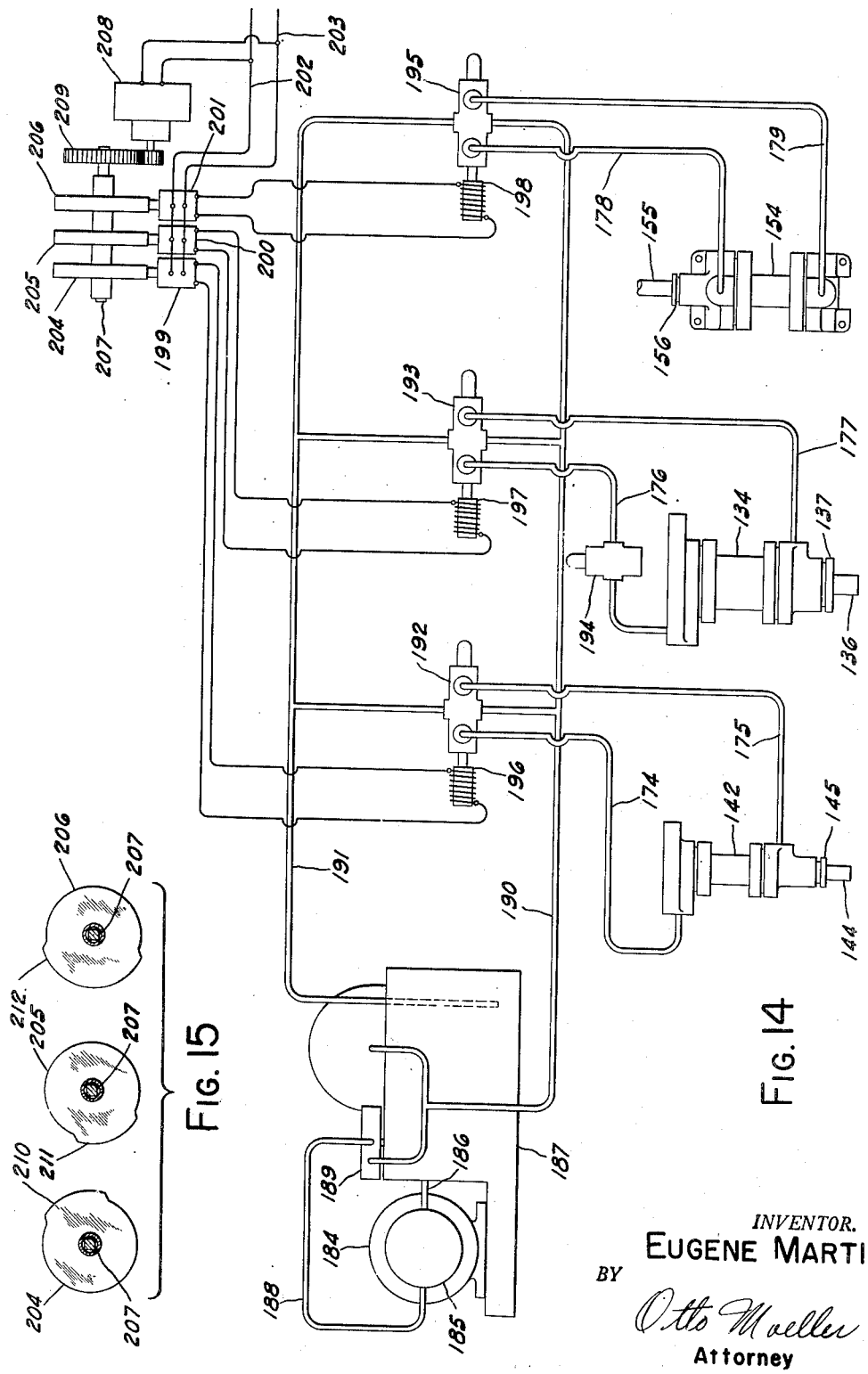
Figure 14 is a diagrammatic view of the hydraulic operating mechanism for the form of the invention shown in Figures 10 to 13.
Figure 15 is a view of the timing cams turned at an angle of 90 degrees to show their relative positions.

Referring to Figure 14, which diagrammatically shows the hydraulic fluid system for operating the upper and lower feed valves 147 and 138, the pressure intake valve 152, and the exhaust valve 153; the fluid lines communicating with the upper and lower ends of the upper feed valve operating cylinder 142 are respectively indicated by the numerals 174 and 175; the fluid lines communicating with the upper and lower ends of the lower feed valve operating cylinder 134 are respectively indicated by the numerals 176 and 177; and the fluid lines communicating with the upper and lower ends of the pressure intake and exhaust valve operating cylinder 154 are respectively indicated by the numerals 178 and 179.

Figure 13:
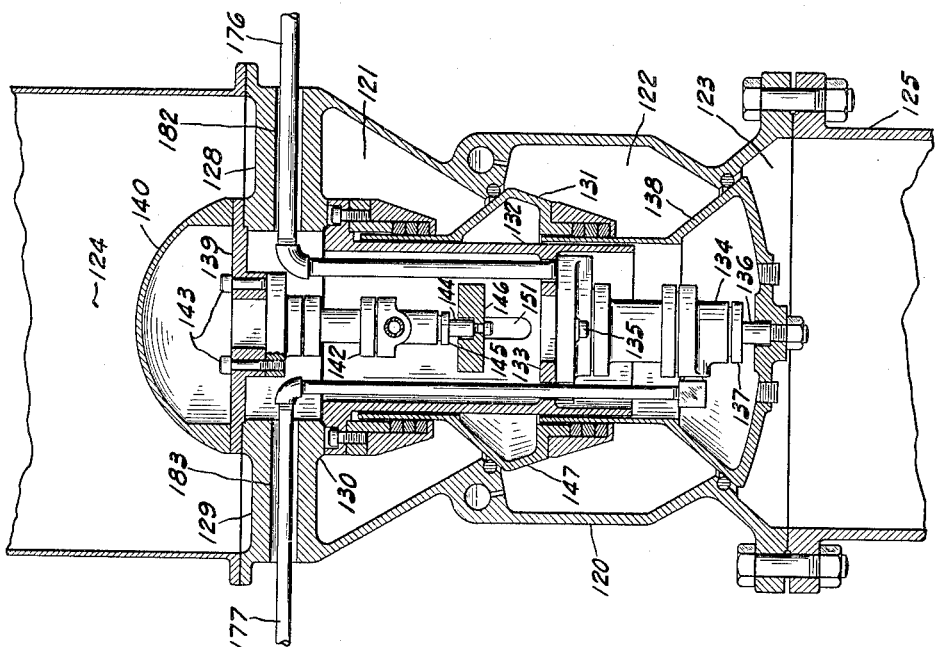
Figure 13 is a sectional view taken on the line 13—13 of Figure 12.

As shown in Figures 10 and 12, the fluid lines 174 and 175 may conveniently extend through the respective passages 180 and 181 formed respectively in the arms 126 and 127, and the fluid lines 176 and 177, as shown in Figures 10 and 13, may conveniently extend through the respective passages 182 and 183 formed respectively in the arms 128 and 129.

The hydraulic fluid lines 174 and 175 serve alternately as intake and return lines to and from their respective sides of the piston (not shown) in cylinder 142, similarly lines 176 and 177 serve alternately as intake and return lines to and from their respective sides of the piston (not shown) in cylinder 134, and likewise lines 178 and 179 serve alternately as intake and return lines to and from their respective sides of the piston (not shown) in cylinder 154.

The hydraulic operating mechanism includes a motor 184 for operating a pump 185, the intake side of which is connected by pipe 186 with the fluid reservoir 187, and the outlet side of which communicates through pipe 188 with a pressure relief valve 189 by which the hydraulic fluid delivered to the supply line 190 is maintained at a constant pressure. A hydraulic fluid return line 191 carries the fluid back to the reservoir 187.

The fluid return line 191, the fluid supply line 190, and the lines 174 and 175 leading to the cylinder 142, each communicates with a port of a four way solenoid operated valve 192 with spring return, whereby in one position of valve 192, line 174 communicates with supply line 190 and line 175 communicates with the return line 191, thereby effecting downward movement of piston stem 144 with resultant opening of the upper feed valve 147, and in the opposite position of valve 192, line 174 communicates with return line 191 and line 175 communicates with supply line 190, thereby effecting upward movement of piston stem 144 with resultant closing of the upper feed valve 147.

A similar four way solenoid operated valve 193 providing selective communication between supply line 190, return line 191 and the lines 176 and 177 to the cylinder 134 controls opening and closing of the lower feed valve 138. A flow control valve 194 is preferably inserted in the line 176 to throttle the passage of the hydraulic fluid from the cylinder 134 during closing of the lower feed valve 138. This prevents slamming of the valve 138 against its seat, which would otherwise occur because of the force exerted against the valve 138 by the pressure in the pressurized tank 125.

A similar four way solenoid operated valve 195 providing selective communication between supply line 190, return line 191 and the lines 178 and 179 to the cylinder 154 controls opening and closing of the pressure intake valve 152 and exhaust or vent valve 153 through the previously described cam member 157 and associated mechanism.

The terminals of the solenoids 196, 197 and 198 of the solenoid operated valves 192, 193 and 195, respectively, are connected through respective normally open switches 199, 200, and 201 to the leads 202 and 203 of a suitable source of electric current. The switches 199, 200 and 201 are arranged to be closed by a sequence timing mechanism including the cam members 204, 205 and 206 mounted to rotate with the shaft 207 operatively connected with the motor 208. The shaft 207 is preferably operated at 4 R. P. M., however, it will be understood that this may be varied, limited only by the length of time required for the coal to empty from the chamber 122. In the present instance a 60 cycle synchronous clock type motor is employed with reduction gearing 209 for operating the shaft at the desired speed. A 3 R. P. M., 4 R. P. M. or other suitable type of motor may, however, obviously be employed.

In Figure 15 the cam members 204, 205 and 206 are shown in front elevation, with their respective cam shoulders 210, 211 and 212 shown in their proper relation for controlling the operation of the upper feed valve 147, lower feed valve 138, pressure intake valve 152 and exhaust valve 153 in desired sequence. The sequential operation of these valves is essentially the same as for the first form of the invention, and since it has been previously described in detail, it need not be repeated. The only difference being that the exhaust valve 153 will, referring to Figure 9, close at O rather than at N as in the first form of the invention, and the pressure intake valve 152 will close at T rather than at S, so that both valves are only momentarily in closed position at the same time.

The feeding device as above described forms a compact unit affording high feeding capacity with a minimum of space requirement. It is particularly adapted for use in feeding against high pressure of the order of 150 p. s. i. and considerably beyond that, though it obviously is equally useful in feeding against lower pressures. Since there is no shearing through the material charge by the elements that seal off the inlet and outlet openings, freezing of the working parts is eliminated and wear on the seals is reduced to a minimum.

It will be obvious to those skilled in the art that changes in the details of construction may be made without departing from the spirit and scope of the invention.

I claim:

1. In a material feeding device, a body providing a pressure chamber between two valve seats, an inlet feed valve cooperating with one of said valve seats to control the inlet to said chamber, an outlet feed valve cooperating with the other of said valve seats to control the outlet from said chamber, means including a valve connecting said chamber with a source of pressure, means including a valve for venting said chamber, and means controlling the sequential operation of said valves including a rotatable shaft and a plurality of cams mounted on and arranged about said shaft to effect operation of one and then the other of said feed valves periodically and to open said pressure intake valve prior to and during operation of said outlet feed valve and to open said vent valve prior to and during operation of said inlet feed valve.

2. In a material feeding device, a body providing a pressure chamber between two valve seats, an inlet feed valve cooperating with one of said valve seats to control the inlet to said chamber, an outlet feed valve cooperating with the other of said valve seats to control the outlet from said chamber, a valve support in said chamber movably supporting said inlet and outlet feed valves, operating means in said valve support for opening and closing one and then the other of said feed valves periodically, a valve controlled pressure intake passage communicating with said chamber, a valve controlled vent passage communicating with said chamber, and means controlling the sequential operation of said valves, to open said vent valve after said outlet feed valve is seated and before said inlet feed valve opens for venting pressure trapped in said chamber, and to open said pressure intake valve after said inlet feed valve is seated and before said outlet feed valve opens for admitting pressure into said chamber.

3. A device adapted for feeding material from a supply receptacle to a receiving receptacle wherein a pressure differential in said receptacles exists, said device comprising a body open at its opposite ends for communication with respective receptacles, spaced inlet and outlet valve seats carried by the inner side walls of said body, feed valves fitting said seats forming a chamber therebetween, means for opening and closing one and then the other of said feed valves periodically, an annular passage in the wall of said body adjacent said inlet valve seat, a plurality of annularly arranged jet openings opening from said annular passage into the upper end of said chamber, means including a valve connecting said passage with a source of pressure at least as great as the pressure in said receiving receptacle and means synchronizing the operation of said pressurizing valve with said feed valves to open said pressurizing valve when said feed valves are closed and in advance of opening of said outlet feed valve and to close said pressurizing valve when said inlet feed valve is open.

4. In a material feeding device, a body providing a pressure chamber between two valve seats, an inlet feed valve cooperating with one of said valve seats to control the inlet to said chamber, an outlet feed valve cooperating with the other of said valve seats to control the outlet from said chamber, a valve support in said chamber movably supporting said inlet and outlet feed valves, operating means in said valve support for opening and closing said feed valves, a valve controlled pressure fluid intake passage communicating with said chamber, a valve controlled vent passage communicating with said chamber, and sequential timer means controlling initiation of operation of said inlet feed valve, said pressure intake valve, said outlet feed valve and said vent valve successively in that order.

EUGENE MARTIN.

References Cited in the file of this patent

UNITED STATES PATENTS

| Number | Name | Date |
|---|---|---|
| 1,369,649 | Gieseler | Feb. 22, 1921 |
| 2,073,553 | Dienst | Mar. 9, 1937 |

FOREIGN PATENTS

| Number | Country | Date |
|---|---|---|
| 29,338 | Netherlands | Mar. 16, 1933 |
| 375,313 | Italy | Oct. 2, 1939 |
| 652,105 | Germany | Oct. 25, 1937 |